US008078952B2

(12) United States Patent
Clinton et al.

(10) Patent No.: US 8,078,952 B2
(45) Date of Patent: Dec. 13, 2011

(54) SITE REDIRECTION

(75) Inventors: Nathaniel T. Clinton, Sammamish, WA (US); Karuna Koneru, Redmond, WA (US); Steve Buroker, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1260 days.

(21) Appl. No.: 11/287,896

(22) Filed: Nov. 28, 2005

(65) Prior Publication Data

US 2007/0124664 A1 May 31, 2007

(51) Int. Cl.
G06F 17/00 (2006.01)
G06F 17/20 (2006.01)
G06F 17/21 (2006.01)
G06F 17/22 (2006.01)
G06F 17/24 (2006.01)
G06F 17/25 (2006.01)
G06F 17/26 (2006.01)
G06F 17/27 (2006.01)
G06F 17/28 (2006.01)

(52) U.S. Cl. ............... 715/208; 715/207; 707/E17.112; 717/170

(58) Field of Classification Search .................. 715/234, 715/207, 208; 717/168–178; 707/E17.112
See application file for complete search history.

(56) References Cited

U.S. PATENT DOCUMENTS

| | | | |
|---|---|---|---|
| 6,047,129 A | 4/2000 | Frye | |
| 6,493,871 B1 * | 12/2002 | McGuire et al. | 717/173 |
| 6,557,054 B2 | 4/2003 | Reisman | |
| 6,639,609 B1 * | 10/2003 | Hayashi | 715/745 |
| 6,715,144 B2 | 3/2004 | Daynes et al. | |
| 6,725,452 B1 * | 4/2004 | Te'eni et al. | 717/168 |
| 6,763,403 B2 * | 7/2004 | Cheng et al. | 710/36 |
| 6,883,168 B1 | 4/2005 | James et al. | |
| 6,918,112 B2 | 7/2005 | Bourke-Dunphy et al. | |
| 7,246,351 B2 * | 7/2007 | Bloch et al. | 717/175 |
| 2002/0032763 A1 | 3/2002 | Cox et al. | |
| 2002/0073057 A1 | 6/2002 | Benoit et al. | |
| 2004/0019889 A1 | 1/2004 | Melchione et al. | |
| 2004/0031028 A1 * | 2/2004 | Hunt et al. | 717/170 |
| 2004/0039827 A1 * | 2/2004 | Thomas et al. | 709/228 |
| 2005/0165903 A1 * | 7/2005 | Doan et al. | 709/217 |
| 2005/0166197 A1 | 7/2005 | Riley | |

FOREIGN PATENT DOCUMENTS

| | | |
|---|---|---|
| CA | 2501499 A1 | 6/2005 |
| WO | WO 2005/033934 A2 | 4/2005 |

OTHER PUBLICATIONS

Amundsen, Michael Using Visual InterDev 6, Dec. 1998, Que Corporation, p. 627-631.*

(Continued)

Primary Examiner — Stephen Hong
Assistant Examiner — Nicholas Hasty
(74) Attorney, Agent, or Firm — Perkins Coie LLP (57) ABSTRACT

A site redirection system and corresponding methods for redirecting a user from a requested site to a target site is provided. When a user navigates to a site on which the redirection system is implemented, the site downloads onto the user's machine client-side redirection logic. The client-side redirection logic collects the machine's configuration information and passes the collected configuration information to the site. On the site, server-side redirection logic uses the received configuration information to determine a target URL based on the configuration information passed by the client-side redirection logic. The server-side redirection logic then passes the target URL to the client-side redirection logic where the final redirection occurs.

20 Claims, 5 Drawing Sheets

OTHER PUBLICATIONS

Barton, Marcus Sams Teach Yourself MCSE Windows 98 in 14 Days, Nov. 1998, Sams Publishing, p. 79.*

Harris, Jeffrey Novell NetWare 6.5 Administrator's Handbook, Dec. 2003, Novell, Inc., p. 590.*

"A completely refreshing way to keep your systems up to date and secure," Sun Update Connection, Copyright 1994-2005, Sun Microsystems, Inc., 4 pages, http://www.sun.com/service/sunupdate/, last accessed Oct. 4, 2005.

Pawlak, Peter, "Free Software Update Technology to Cover All Products," Directions on Microsoft, posted Jan. 24, 2005, 7 pages, http://www.directionsonmicrosoft.com/sample/DOMIS/update/2005/02feb/0205fsuttc.htm, last accessed Oct. 4, 2005.

"Update Service Business Benefits Overview," Macrovision, published Oct. 2004, 14 pages.

"Simplified Patch Management," St. Bernard Software, UpdateEXPERT, Copyright 2001-2005, St. Bernard Software http://www.stbernard.com/products/updateexpert/_updateexpert.asp, last accessed Oct. 4, 2005.

* cited by examiner

FIG. 1

```
<!-- URL Constants -->
<url>
...
    <v4url site="4" targetURL="http://v4.windowsupdate.microsoft.com" />    206
    <v5url site="5" targetURL="http://v5.windowsupdate.microsoft.com" />    208
...
    <v6Live site="6Live" targetURL="http://update.microsoft.com/windowsupdate" />    210
    <v6MULive site="6MULive" targetURL="http://update.microsoft.com/microsoftupdate" />    212
</url>
...
<!-- URL Parsing Scenarios -->
<OS value="5.2" TargetSite="v4url">
    <Processor value="ia64,wow64" TargetSite="v4url">
        <Lang value="" TargetSite="v4url">
            <SP minMajor="" maxMajor="0" Minor="0" TargetSite="v4url">
                <CurrentSite value="" TargetSite="v4url" />
            </SP>
            <SP minMajor="1" maxMajor="" Minor="0" TargetSite="v6Live">
                <CurrentSite value="" TargetSite="v6Live">
                    <control value="5.8.0" minVersion="2284" maxVersion="" TargetSite="v6Live">
                        <MUOptIn value="true" TargetSite="Serviceurl" />
                    </control>
                </CurrentSite>
            </SP>
        </Lang>
    </Processor>
    <Processor value="x64,amd64" TargetSite="v6Live">
        <Lang value="" TargetSite="v6Live">
            <SP minMajor="1" maxMajor="" Minor="0" TargetSite="v6Live">
                <CurrentSite value="" TargetSite="v6Live">
                    <control value="5.8.0" minVersion="2284" maxVersion="" TargetSite="v6Live">
                        <MUOptIn value="true" TargetSite="Serviceurl" />
                    </control>
                </CurrentSite>
            </SP>
        </Lang>
    </Processor>
    ...
</OS>
...
```

202 (URL Constants section)
204 (URL Parsing Scenarios section)

*FIG. 2A*

```
<OS value="5.1" TargetSite="V6Live">  ⎯214
    <Processor value="x86" TargetSite="V6Live">  ⎯216
        <Lang value="" TargetSite="V6Live">  ⎯220
            <SP minMajor="" maxMajor="" TargetSite="V6Live">  ⎯222
                <CurrentSite value="" TargetSite="V6Live">  ⎯224
                    <control value="5.8.0" minVersion="2284" maxVersion="" TargetSite="V6Live">  ⎯226
                        <MUOptIn value="true" TargetSite="Serviceurl" />  ⎯228
                    </control>
                </CurrentSite>
            </SP>
        </Lang>
    </Processor>
    ....
    <Processor value="ia64,wow64" TargetSite="V4url">  ⎯218
        <Lang value="" TargetSite="V4url">
            <SP minMajor="" maxMajor="" TargetSite="V4url">
                <CurrentSite value="" TargetSite="V4url" />
            </SP>
        </Lang>
    </Processor>
</OS>
....
<OS value="6.0" TargetSite="LHThanks">
    <Processor value="" TargetSite="LHThanks">
        <Lang value="" TargetSite="LHThanks">
            <SP minMajor="" maxMajor="" TargetSite="LHThanks">
                <CurrentSite value="" TargetSite="LHThanks" />
            </SP>
        </Lang>
    </Processor>
</OS>
```

① User navigates to the site

② Download client-side redirection logic as part of the site's default page

③ Client-side redirection logic obtains configuration information

④ Pass the configuration information to the site

⑤ Server-side redirection logic determines target URL based on the configuration information ⑥ Provide client-side redirection logic the target URL ⑦ Client-side redirection logic performs final redirection based on the target URL

SITE REDIRECTION

BACKGROUND

The proliferation of computers and the maturing of the Internet and the World Wide Web ("web") have resulted in the web increasingly becoming a medium used to deliver software, such as application programs and operating system programs, and updates to the software to consumers. Indeed, many software providers are delivering their software, including updates to the software, to their consumers over the web.

Software providers typically release different versions of software via versions of corresponding software packages. The software and any future updates to the software are provided via a web site, and the software typically includes "hard-coded" entry points (e.g., hard-coded URLs) which allow users of the software to connect to the web site in order to become aware of and receive updates to the software. For example, MICROSOFT provides a WINDOWS Update site that provides updates for a particular version or versions of the WINDOWS operating system software and WINDOWS-based hardware. Each version of the WINDOWS operating system provides an entry point, such as a WINDOWS Update shortcut in a "Start" menu, into its appropriate WINDOWS Update site. To receive updates, a user can access the site addressed by the entry point (e.g., clicking on the "WINDOWS Update" icon that is provided on the "Start" menu). This navigates the user to a site that is appropriate for the version of the software (e.g., operating system) that is currently installed on the user's computer system. When the user is at the site, the site scans the user's computer system and tells the user which updates apply to the user's software and hardware. The user can then choose the updates that the user wants to install and how to install them. At the appropriate time, the site (e.g., the server) informs an update agent executing on the user's computer system of the user's selected updates, and instructs the update agent to install the selected updates. The update agent then interacts with the site, and the web services to install the user selected updates. The update agent is typically provided with the software package and is installed and executed on the computer system along with the software.

Unfortunately, delivering software packages and updates to software packages in this manner is limited by the hard-coded entry points included in the software package. Once the hard-coded URL is specified in software, it cannot be easily changed. Thus, the software provider is limited or restricted to providing updates to a version of the software package through the site that is addressed by the hard-coded entry point in the software. Likewise, a specific version of the software is only able to receive updates through the site addressed by the hard-coded entry point in the software.

SUMMARY

A site redirection system and corresponding methods for redirecting a user from a requested site to a target site is provided. When a user navigates to a site on which the redirection system is implemented, the site downloads onto the user's machine client-side redirection logic. The client-side redirection logic collects the machine's configuration information and passes the collected configuration information to the site. On the site, server-side redirection logic uses the received configuration information to determine a target URL based on the configuration information passed by the client-side redirection logic. The server-side redirection logic then passes the target URL to the client-side redirection logic where the final redirection occurs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 2A and 2B illustrate selected contents of an example redirect URL file, according to some embodiments.

DETAILED DESCRIPTION

A site redirection system and corresponding methods for redirecting a user from a requested site (also referred to interchangeably herein as a "web site") to a target site is provided. The redirection system may be implemented on a site or multiple sites. For example, an organization, such as a software provider, can implement the redirection system on one or more of the organization's sites in order to redirect users navigating to any one of these sites to a target or destination site more appropriate for the user.

In some embodiments, when a user executes a browser program on his or her computer system (also referred to interchangeably herein as a "machine" or "client machine") and navigates to one of the organization's sites on which the redirection system is implemented, the site downloads onto the user's machine client-side redirection logic. The client-side redirection logic is the starting point for redirection, and executes on the user's machine to collect and store the machine's configuration information, such as, by way of example, information regarding the operating system (OS) that is executing on the machine (e.g., version, service pack, etc.), the processor (CPU) that is executing on the machine, the browser program executing on the machine (e.g., version), localization information (e.g., language) of the machine, etc. The client-side redirection logic passes the collected configuration information to the site. On the site, server-side redirection logic uses the received configuration information parse a redirect URL file. The redirect URL file contains logic that the server-side redirection logic parses or "drills-down" using the configuration information passed by the client-side redirection logic to determine a target uniform resource locator (URL). The server-side redirection logic then passes the target URL to the client-side redirection logic on the user's machine. If the target URL is the URL of the site (i.e., the site navigated to by the user), the server-side redirection logic can inform the client-side redirection logic that the user is at the appropriate site and there is no need to redirect the user. Upon receiving the target URL, the client-side redirection logic redirects the user (e.g., the user's browser program) to the site corresponding to or addressed by the target URL.

Many software providers and other organizations include a client program, such as an update agent, as part of a software product or package as explained above. In some embodiments, where such a user agent is installed and executing on the user's machine, information regarding or related to the update agent can also used in determining the target URL. For example, the client-side redirection logic can collect as part of the machine's configuration information, information regarding or related to the update agent, such as, by way of example, the version of the update agent, the build of the update agent, an opt-in status that indicates whether the user has elected or opted to receive content provided on another of the organization's sites, etc. The client-side redirection logic passes the collected configuration information to the server-side redirection logic on the site. The server-side redirection logic uses the received configuration information parse the redirect URL logic to determine a target URL, which it then passes to the client-side redirection logic where the final redirection occurs.

Regarding the opt-in status, the update agent is typically configured to interact with a single site. For example, the update agent may be configured to interact with a site that belongs to the organization that provided the software product which included the update agent. The organization uses this site to provide content (e.g., information and products, including updates) related to the software product. The opt-in status is an indication that the user has elected to receive content (e.g., notifications and updates of products and services) that is offered through another site belonging to the organization that provided the software product. For example, the user may have navigated to one of the other sites provided by the organization (i.e., a site other than the site that is configured within the update agent) and made an election (i.e., opted-in) to receive content through this site. In response, this site provides the update agent on the user's machine a notification of the user's opt-in decision. The update agent on the user's machine can record the user's election to receive content through another site, and provide the opt-in status information to the client-side redirection logic when requested.

In some embodiments, the server-side redirection logic uses the configuration information in a predetermined sequence, one item of information at a time, to parse the redirect URL logic as far as it can. For example, the configuration information may indicate that the user is running WINDOWS XP, service pack SP2, is using an x86 processor, and is configured for English localization. In this instance, the server-side redirection logic may parse the redirect URL logic first for the WINDOWS XP node. If the WINDOWS XP node is found, the server-side redirection logic can then parse within the WINDOWS XP node for the English localization node. If English localization node is found, the server-side redirection logic can then parse within the English localization node that is within the WINDOWS XP node for the x86 processor node. If x86 processor node is found, the server-side redirection logic can then parse within the x86 processor node that is within the English localization node that is within the WINDOWS XP node for the service pack SP2 node. Each node in the redirect URL logic has a corresponding target URL. The server-side redirection logic parses the redirect URL logic in this manner until a node corresponding to an item of configuration information is not found. The target URL passed to the client-side redirection logic is the target URL that corresponds to the last node found in the redirect URL logic. For example, in the example above, if the x86 processor node is not found in the redirect URL logic, then the target URL corresponding to the English localization node within the WINDOWS XP node is the target URL that is passed to the client-side redirection logic. In the instance where all nodes are found in the redirect URL logic, then the target URL corresponding to the last node is the target URL that is passed to the client-side redirection logic. In the instance where the first node searched for is not found in the redirect URL logic, then a default URL may be passed as the target URL to the client-side redirection logic.

One skilled in the art will appreciate that many variations of the configuration information used to determine a target URL are possible. For example, the client-side redirection logic may not collect all of the configuration information listed above, or may collect additional configuration information than that listed above. Moreover, the server-side redirection logic may not utilize all of the configuration information provided by the client-side redirection logic to determine a target URL. One skilled in the art will also appreciate that many variations of the order in which the items of configuration information are used to parse the redirect URL logic are possible.

Figure 1:
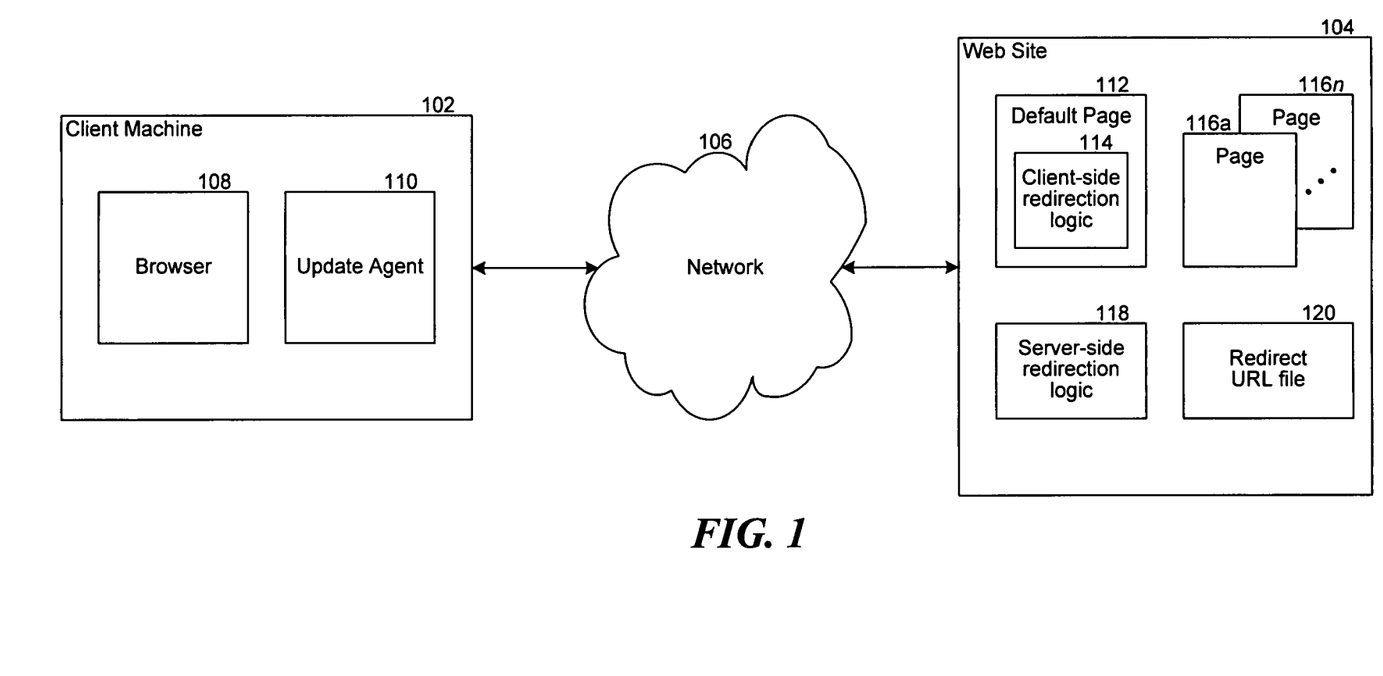
FIG. 1 is a block diagram illustrating components of a site redirection system, according to some embodiments.

FIG. 1 is a block diagram illustrating components of a site redirection system, according to some embodiments. As depicted, a client machine 102 and a web site 104 are each coupled to a network 106. The client machine comprises a browser 108 and an update agent 110. The web site comprises a default page 112 which includes client-side redirection logic 114, a plurality of web pages 116$a$-$n$, server-side redirection logic 118, and a redirect URL file 120. Only one client machine and web site are shown in FIG. 1 for simplicity and one skilled in the art will appreciate that there may be multiple client machines and multiple web sites in the site redirection system. As used herein, the terms "connected," "coupled," or any variant thereof, means any connection or coupling, either direct or indirect, between two or more elements; the coupling or connection between the elements can be physical, logical, or a combination thereof.

The client machine is used by a user to navigate to the site and may include any type of computing device, such as a personal digital assistant, a cell phone, a personal computer, and so on. The browser is a software application that is executed and used to locate and navigate to web sites and to display web pages provided by the web sites. The update agent is a client application that facilitates interaction with the web site to for example, receive one or more products/services provided by the web site. For example, if the web site provides software products, updates and revisions to the software products, and information regarding the software products, the update agent may facilitate installation of one or more of the products, updates and revisions, and information onto the client machine.

The web site is a location on the World Wide Web, and is provided by organizations such as software providers, product providers, and so on. The default page is a home page of the web site, and is the first document that users see when users enter the web site. The client-side redirection logic is provided as part of, or with, the default page, and contains the logic to gather or obtain the configuration information on the client machine. In some embodiments, the client-side redirection logic can be implemented using MICROSOFT JSCRIPT, which is a scripting language that can be "plugged in" to an application, such as MICROSOFT's Internet Explorer (IE) browser program. For example, where the browser program on the client machine is IE and the client-side redirection logic is implemented using JSCRIPT, the client-side redirection logic can obtain some or all of the configuration information by parsing a user agent string that is provided by IE. The IE user agent string includes information regarding the OS executing on the client machine, the language configured on the client machine, the IE application running on the machine, etc. Where an update agent is present on the client machine, the client-side redirection logic queries the update agent for configuration information related to, and which can be provided by the update agent, such as the version of the update agent, the build of the update agent, etc. In some embodiments, the client-side redirection logic may be implemented as an ACTIVEX control that can be downloaded onto the client machine as part of the default page and executed by the browser on the client machine. The client-side redirection logic implemented as an ACTIVEX control may obtain the information by requesting the information from one or more other programs, such as the OS, which are running on the client machine. In still other embodiments, the client-side redirection logic may be implemented using other technologies, frameworks or programming languages that are suitable for downloading onto the client machine and sharing information with other programs running on the client machine.

The web pages are the documents that contain the content provided on the web site. The server-side redirection logic contains the logic that determines a target URL by parsing the redirect URL file using the data (i.e., the configuration information) provided by the client-side redirection logic, and which passes the target URL to the client-side redirection logic. In some embodiments, the server-side redirection logic can be implemented as an active server page on the web site. As is generally known, an active server page is a dynamically created web page that is provided to a browser program, for example, running on the client machine, in response to the browser program requesting the active server page. For example, where the browser program on the client machine is IE, the client-side redirection logic is implemented using JSCRIPT, and the server-side redirection logic is implemented as an active server page, the client-side redirection logic can pass the configuration information to the server-side redirection logic via an "xmlpost" operation, which causes the server-side redirection logic to return the target URL to the client-side redirection logic. One skilled in the art will appreciate that other programming languages and techniques may be used to implement the server-side redirection logic.

The redirect URL file contains the logic that is parsed by the server-side redirection logic to determine a target URL. In some embodiments, the redirect URL file can be implemented using extensible markup language (XML). XML allows for the creation of customized tags, thus enabling the definition, transmission, validation, and interpretation of data between applications. The redirect URL file is further described below.

In general terms, the network is a communications link that facilitates the transfer of electronic content between, for example, the attached client machine and web site. In some embodiments, the network includes the Internet. It will be appreciated that the network may be comprised of one or more other types of networks, such as a local area network, a wide area network, a point-to-point dial-up connection, and the like.

The computing device on which the site redirection system is implemented may include a central processing unit, memory, input devices (e.g., keyboard and pointing devices), output devices (e.g., display devices), and storage devices (e.g., disk drives). The memory and storage devices are computer-readable media that may contain instructions that implement the site redirection system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the site redirection system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The site redirection system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2B:
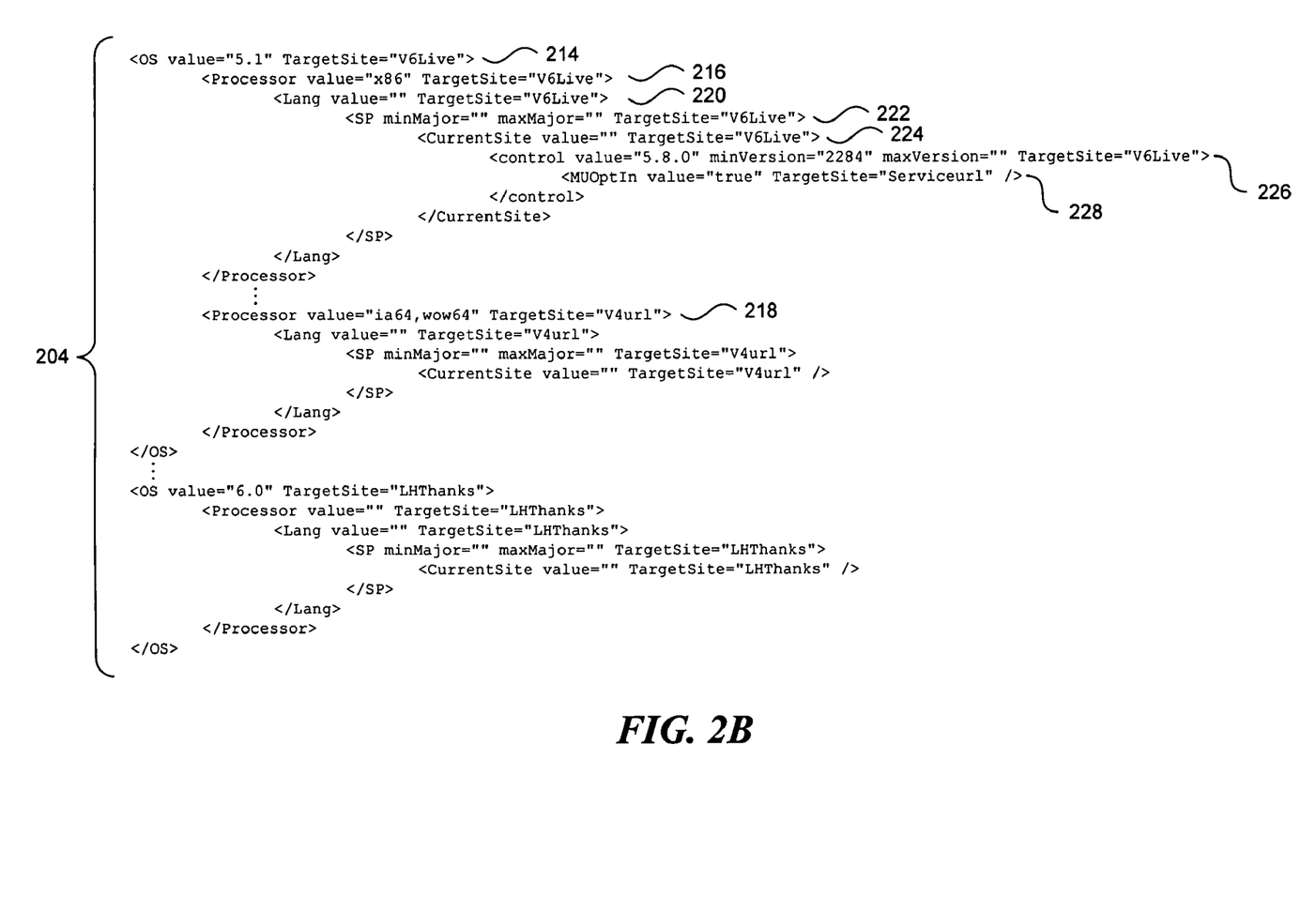

FIGS. 2A and 2B illustrate selected contents of an example redirect URL file, according to some embodiments. The redirect URL file comprises a URL constants section 202 and a URL parsing logic section 204. The URL constants section contains the target URLs specified as attributes/value pairs for various site nodes. For example, and as depicted in FIG. 2, element 206 specifies that the targetURL is "http://v4.windowsupdate.microsoft.com" for the V4url node (site="4"). Similarly, element 208 specifies that the targetURL is "http://v5.windowsupdate.microsoft.com" for the V5url node (site="5"), element 210 specifies that the targetURL is "http://update.microsoft.com/windowsupdate" for the V6Live node (site="6Live"), and element 212 specifies that the targetURL is "http://update.microsoft.com/microsoftupdate" for the V6MULive node (site="6MULive").

The URL parsing logic section contains nested node values that are parsed to ultimately determine a target URL. As illustrated by the contents of the parsing logic section, the nodes are nested in the following sequence: "OS" (OS value); "Processor" (the processor on the user's client machine); "Lang" (the language configured on the user's client machine); "SP" (the service pack value of the installed OS—e.g. Windows XP Service Pack 2); "CurrentSite" (the version of the current site that the user has navigated to); "control" (the version of the update agent running on the user's client machine); and "MUOptIn" (a Boolean flag that indicates whether the user has opted-in to receive content from the MU site). The SP node and the control node each specify a range of values within which to check for a match. For example, assuming the control version is "2367," the minVersion is specified as "2300," and the maxVersion is specified as "2400," this check would result as true, since the actual version (i.e., 2367) falls within the specified range (i.e., 2300 to 2400). Specifying a range of values also allows for open ended checks—e.g. assuming 2300 is the specified minVersion and no maxVersion is specified, then any control version equal to or greater than 2300 would result in a match.

By way of example, and as depicted in FIG. 2, element 214 specifies that the TargetSite is "V6Live" for the "5.1" OS node. Within this OS node, element 216 specifies that the TargetSite is "V6Live" for the "x86" processor node, and element 218 specifies that the TargetSite is "V4url" for the "ia64,wow64" processor node. Within the "x86" processor node, element 220 specifies that the TargetSite is "V6Live"

for the specified Lang (i.e., language) node. A "blank" or empty value signifies a "wildcard," and a blank value for an attribute indicates that the attribute matches all values. Therefore, all languages correspond to the TargetSite "V6Live." Within the Lang node, element 222 specifies that the TargetSite is "V6Live" for the specified range of SP nodes. Because the range of values are empty (minMajor="" and maxMajor=""), all SP values correspond to the TargetSite "V6Live." Within the SP node, element 224 specifies that the TargetSite is "V6Live" for the specified CurrentSite node. Because the value for the CurrentSite is empty, all CurentSite values correspond to the TargetSite "V6Live." Within the CurrentSite node, element 226 specifies that the TargetSite is "V6Live" for the "5.8.0" control node having a version that is at least "2284" (within a range minVersion="2284" and maxVersion=""). Within the "5.8.0" control node, element 228 specifies that the TargetSite is "ServiceURL" if the MUOptin node is set to "true" (i.e., the user has opted-in to the MU site).

In some embodiments, the items of configuration information are used in a predetermined sequence to parse the nodes in the redirect URL file. Moreover, when an item of configuration information matches a node in the redirect URL file, the next item of configuration information in the sequence is compared to the nodes within the matching node to determine if there is a match between the next item of configuration information and any of the nodes. Stated differently, the next item of configuration information is checked against the nodes in a nesting level that is within the nesting level of the node that successfully matched the preceding item of configuration information in the sequence. This matching process is repeated until the server-side redirection logic fails to find a matching node for an item of configuration information (i.e., the first item of configuration information that fails to match a node in the redirect URL file). When an item of configuration information fails to match a node, a target URL corresponding to the last matching node (the node that matched the item of configuration information that preceded in sequence the item of configuration information for which a match was not found) is used as the target URL. If all items of information are successfully matched by nodes in the redirect URL file, then a target URL corresponding to the last node that is matched is used as the target URL.

By way of an example of parsing the nodes in the example redirect URL file to determine a target URL, the configuration information may indicate the following: OS=5.1; language=en; processor=x86; SP=1; CurrentSite=v4; and control=5.7.xxxx. To determine a target URL using this configuration information, the server-side redirection logic may parse the redirect URL file above first for the OS node. In this case, the OS is 5.1, therefore, the server-side redirection logic falls into the OS node that matches 5.1 (element 214). Next, the server-side redirection logic drills down into the matching OS node looking to match the processor node. In this case, there is a match for processor=x86, therefore, the server-side redirection logic falls into the Processor node that matches x86 (element 216). Next, the server-side redirection logic drills down into the matching processor node looking to match the Lang node. Because the Lang node is present with a blank value, the Lang node matches any value, including en. Therefore, there is a match for language=en and the server-side redirection logic falls into the Lang node that matches en (element 220). Next, the server-side redirection logic drills down into the matching Lang node looking to match the SP node. The SP node specifies a range of values, and the server-side redirection logic looks for a range that includes a value of 1 for the SP. There is one SP node specified within the matching Lang node, and the specified SP node has a blank value for the range limits (i.e., minMajor="" and maxMajor=""). Because the SP node has a blank value for the range limits, it is a mach for SP=1, and the server-side redirection logic falls into the SP node that matches 1 (element 222). Next, the server-side redirection logic drills down into the matching SP node looking to match the CurrentSite node. Because the CurrentSite node is present with a blank value, the CurrentSite node matches any value, including v4. Therefore, there is a match for CurrentSite=v4 and the server-side redirection logic falls into the CurrentSite node that matches v4 (element 224). Next, the server-side redirection logic drills down into the matching CurrentSite node looking to match the control node. In this example, the server-side redirection logic is not able to find a control node that matches control=5.7.xxxx. Failing to find a match, the server-side redirection logic falls back up to the previous matching CurrentSite node (element 224) and uses that node's TargetSite URL (i.e., V6Live). The server-side redirection logic determines from the URL constants section that node V6Live corresponds to TargetURL http://update.microsoft.com/windowsupdate.

One skilled in the art will appreciate that one or more of the aforementioned nodes may not be specified within any particular nesting of the nodes in the redirect URL file, for example, as illustrated by the nesting of the nodes within the "ia64,wow64" processor node in element 218. One skilled in the art will also appreciate that other nodes corresponding to additional configuration information may be specified in the redirect URL file. One skilled in the art will further appreciate that a different sequential order for using the items of configuration information and/or a different nesting order for the nodes specified in the redirect URL file may be used. For example, the server-side redirection logic may first try to match the processor value instead of the OS value. As another example, the Processor node may be nested within the Lang node.

Figure 3:
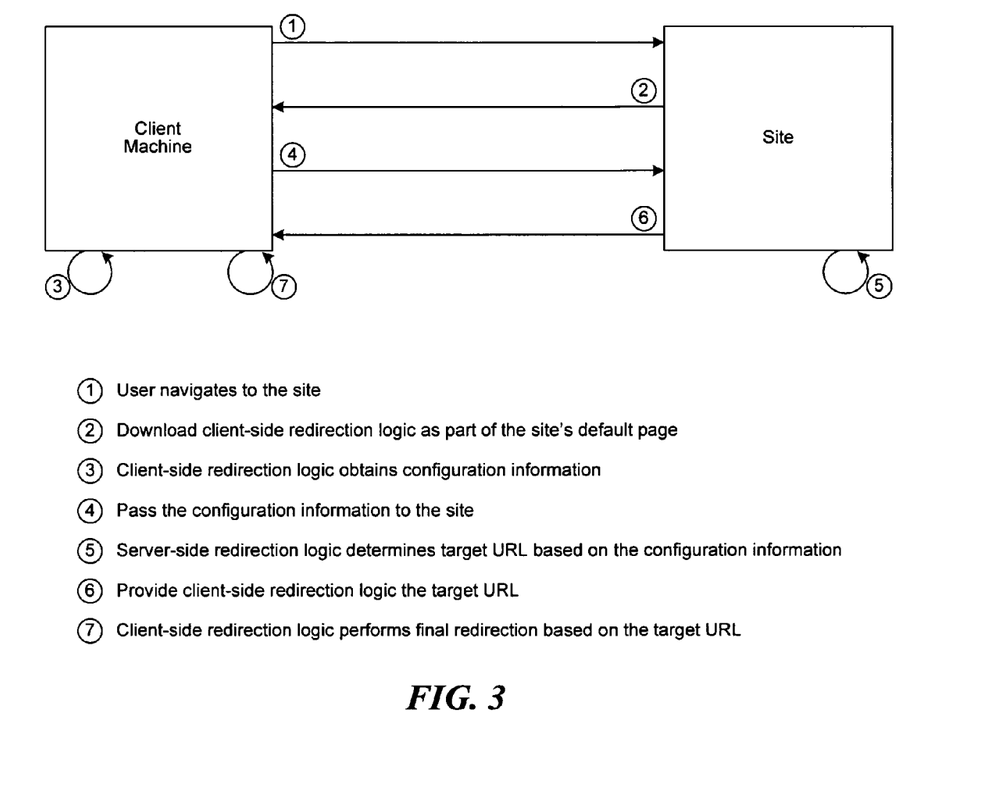
FIG. 3 is diagram illustrating the flow of information between a client machine and a site, according to some embodiments.

FIG. 3 is diagram illustrating the flow of information between a client machine and a site, according to some embodiments. By way of example, a user may execute a browser program on the client machine and request to access (e.g., navigate to) the site (stage 1). In response, the site downloads onto the client machine the client-side redirection logic as part of the site's default page (stage 2). In some instances, the site's default page and the client-side redirection logic may already be on the client machine, for example, as a result of the user previously accessing the site. The client-side redirection logic executes on the client machine and obtains the configuration information (i.e., information regarding the client machine's configuration) (stage 3). The client-side redirection logic passes the obtained configuration information to the site (stage 4). Server-side redirection logic on the site uses the configuration information to determine a target URL (stage 5). The server-side redirection logic provides the client-side redirection logic the target URL (stage 6). The client-side redirection logic performs the final redirection based on the target URL (stage 7). For example, if the current site is not the site corresponding to the target URL, the client-side redirection logic redirects the user to the site corresponding to the target URL. Otherwise, if the current site is the site that corresponds to the target URL, the client-side redirection logic does not redirect the user (the user is already at the site corresponding to the target URL).

Figure 4:
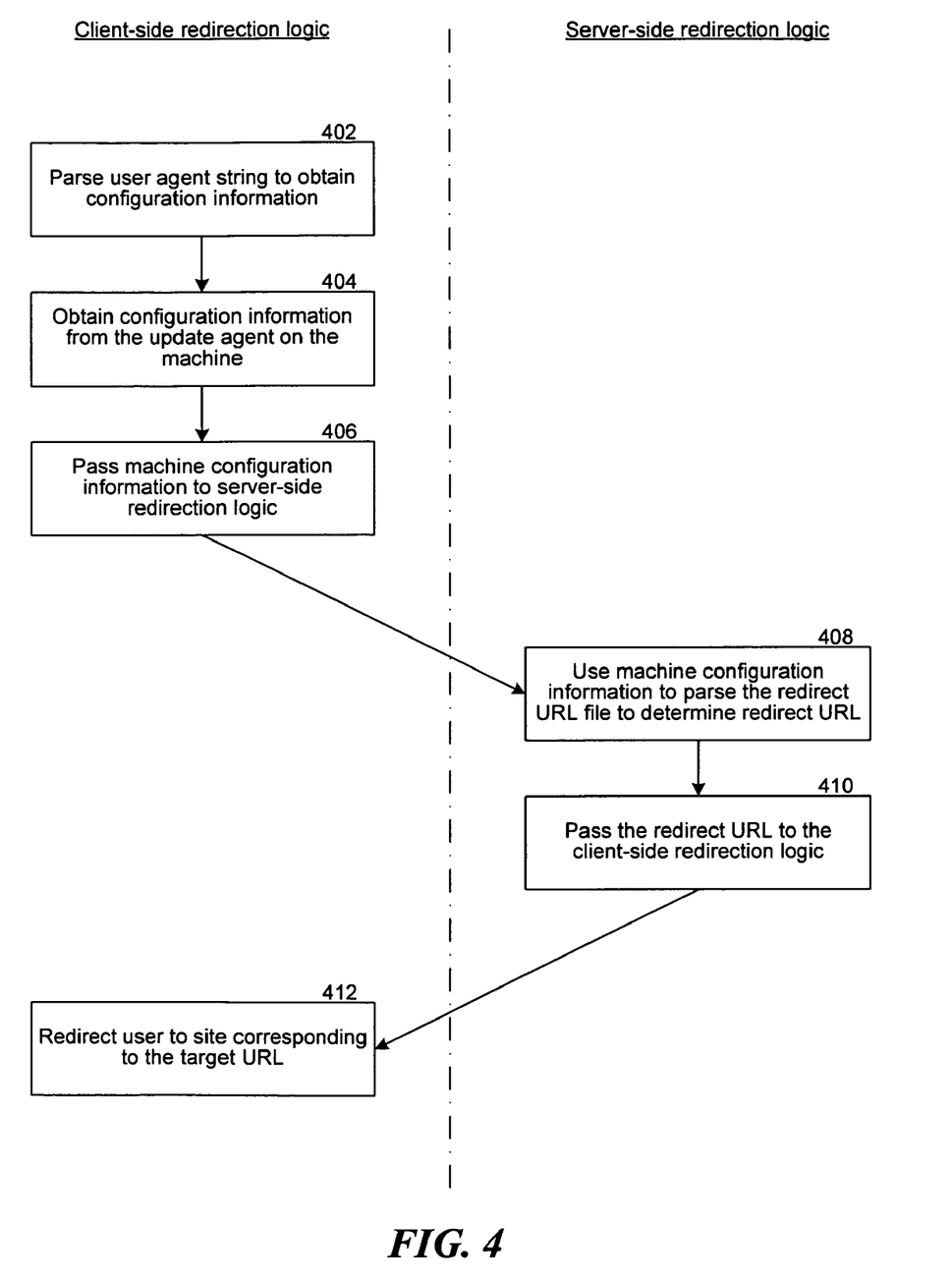
FIG. 4 is a flow diagram that illustrates the processing of the client-side redirection logic and server-side redirection logic, according to some embodiments.

FIG. 4 is a flow diagram that illustrates the processing of the client-side redirection logic and server-side redirection logic, according to some embodiments. By way of example, a user may have used an IE browser executing on a client machine to navigate to a site, and the site may have downloaded the client-side redirection logic implemented on the client machine. In block 402, the client-side redirection logic parses a user agent string provided by the IE browser to obtain configuration information (i.e., information regarding the client machine's configuration). In block 404, the client-side redirection logic obtains additional configuration information from the update agent on the client machine. In block 406, the client-side redirection logic passes the machine configuration information to the server-side redirection logic. In block 408, the server-side redirection logic uses the machine configuration information to parse the redirect URL file to determine a target URL. In block 410, the server-side redirection logic passes the target URL to the client-side redirection logic. In block 412, the client-side redirection logic redirects the user to a site corresponding to the target URL.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method in a computer system having a memory and a processor for redirecting a client based on a configuration of the client, the method comprising:
   at a web site, the web site being separate from the client and storing server-side redirection logic,
      storing redirect URL logic comprising a set of nested nodes each corresponding to an item of configuration information, wherein each node has at least one associated value and an associated URL,
      receiving from the client a request to access a first page of the web site, the request specifying a first URL corresponding to the first page of the web site,
      when it is determined that client-side redirection logic is not installed on the client, sending the client the client-side redirection logic, the client-side redirection logic for collecting configuration information of the client and sending the collected configuration information to the web site,
      obtaining configuration information sent from the client, the configuration information having been collected at the client by the client-side redirection logic and containing a plurality of items having values corresponding to a current configuration of the client,
      executing the server-side redirection logic to determine whether the obtained configuration information matches an ordered sequence of the set of nested nodes that includes a first matched node that is not nested within another node, each sequence of nodes corresponding to a configuration, wherein the server-side redirection logic is configured to parse the redirect URL logic in a predetermined sequence based on the ordering of the nested nodes of the redirect URL logic, and compare items of the configuration information to nodes of the redirect URL logic until either an item of the configuration information fails to match a node of the redirect URL logic or all items of the configuration information are successfully matched to nodes of the redirect URL logic,
      when the obtained configuration information does not match an ordered sequence of the set of nested nodes, sending an indication of a default URL to the client-side redirection logic, and
      when the obtained configuration information matches an ordered sequence of the set of nested nodes,
         identifying a URL associated with the last matched node of the matched ordered sequence,
         when it is determined that the identified URL corresponds to the first URL specified in the request received from the client, sending to the client-side redirection logic an indication that the first URL corresponds to the configuration of the client, and
         when it is determined that the identified URL does not correspond to the first URL specified in the request received from the client, sending the identified URL to the client to effect the redirecting of the client based on the configuration of the client.

2. The method of claim 1, wherein the web site provides the client a successful response upon determining that the target URL addresses the web site.

3. The method of claim 1, wherein the client configuration information is obtained by executing a client-side redirection logic on the client.

4. The method of claim 3, wherein the client-side redirection logic is provided to the client as part of a default page of the web site.

5. The method of claim 1, wherein the client configuration information comprises an indication of an operating system executing on the client.

6. The method of claim 1, wherein the client configuration information comprises an indication of the type of processor on the client.

7. The method of claim 1, wherein the client configuration information comprises localization information.

8. The method of claim 1, wherein the client configuration information comprises an indication of the version of an update agent executing on the client.

9. The method of claim 1, wherein the client configuration information comprises an indication of a version of the web site.

10. The method of claim 1, wherein the client configuration information comprises an indication of a version of an update agent executing on the client, wherein the update agent is configured to provide updates provided by a first service.

11. The method of claim 10, wherein the client configuration information comprises an indication of whether the client has opted-in to receive updates provided by a second service.

12. A method in a computer system having a memory and a processor for navigating to a site that is separate from the computer system, the method comprising:
   sending a request to access a site, the request including a first URL corresponding to a first page of the site;
   receiving from the site client-side redirection logic, wherein the client-side redirection logic is configured to obtain computer system configuration information and further wherein the site is configured to determine whether obtained configuration information indicates a first configuration or a second configuration of the client based at least in part on the configuration information passed to the site by the computer system;
   with the client-side redirection logic, obtaining computer system configuration information;
   with a processor, passing the obtained configuration information to the site;
   responsive to the site determining that the obtained configuration information corresponds to the first configuration, receiving from the site an indication that the first URL included in the request corresponds to the configuration of the client; and responsive to the site determining that the obtained configuration information corresponds to the second configuration, receiving from the site a second URL corresponding to a second page of the site as a redirection of the request to access the site to effect the redirecting of the client based on the configuration of the client.

13. The method of claim 12, wherein the target URL addresses the site.

14. The method of claim 12, wherein the client-side redirection logic is received with a default page of the site.

15. The method of claim 12, wherein the client-side redirection logic obtains at least one item of configuration information from an update agent executing on the computer system.

16. The method of claim 12, wherein the client-side redirection logic obtains at least one item of configuration information from a user agent string.

17. A computer-readable storage medium containing instructions that, when executed by a computer having a memory and a processor, cause the computer to perform a method for redirecting a client, the method comprising:

receiving redirect URL logic comprising a set of nested nodes, each node corresponding to an item of configuration information and having at least one associated value and an associated URL;

receiving at the web site, from a client, a request specifying a first URL of a first page of the web site, the client being separate from the web site;

in response to receiving the request at the web site, sending the client client-side redirection logic, the client-side redirection logic configured to install on the client and obtain configuration information about the client, the client-side redirection logic also configured to send the web site the obtained configuration information;

receiving at the web site, client configuration information from the client-side logic installed on the client;

at the web site, comparing items of the client configuration information to nodes of the redirect URL logic until either an item of the configuration information fails to match a node of the redirect URL logic or each item of the configuration information is successfully matched to a node;

in response to determining that the URL associated with the last node matched to an item of the configuration information corresponds to the configuration of the client, sending to the client an indication that the first URL of the first page of the website specified in the received request corresponds to the configuration of the client; and in response to determining that the URL associated with the last node matched to an item of the configuration information does not correspond to the configuration of the client, sending to the client the URL associated with the last node matched to an item of the configuration information, such that the client is redirected based on the received client configuration information.

18. The computer-readable storage medium of claim 17, wherein the client-side redirection logic is sent to the client with a default page of the web site.

19. The computer-readable storage medium of claim 18, wherein the target URL is determined by a redirect page on the web site.

20. The computer-readable storage medium of claim 17, wherein at least one node is associated with a range of values.

* * * * *